(12) United States Patent
Xu et al.

(10) Patent No.: US 11,531,436 B2
(45) Date of Patent: Dec. 20, 2022

(54) TOUCH PANEL AND METHOD OF MANUFACTURING THE SAME, ELECTRONIC DEVICE

(71) Applicants: Hefei Xinsheng Optoelectronics Technology Co., Ltd., Anhui (CN); BOE Technology Group Co., Ltd., Beijing (CN)

(72) Inventors: Jiawei Xu, Beijing (CN); Taofeng Xie, Beijing (CN); Wenjin Fan, Beijing (CN); Zhao Dong, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 541 days.

(21) Appl. No.: 16/473,786

(22) PCT Filed: Jan. 8, 2019

(86) PCT No.: PCT/CN2019/070896
§ 371 (c)(1),
(2) Date: Jun. 26, 2019

(87) PCT Pub. No.: WO2019/242301
PCT Pub. Date: Dec. 26, 2019

(65) Prior Publication Data
US 2021/0365152 A1    Nov. 25, 2021

(30) Foreign Application Priority Data
Jun. 22, 2018 (CN) .......................... 201810654214.9

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04102* (2013.01);
(Continued)

(58) Field of Classification Search
None
See application file for complete search history.

(56) References Cited

U.S. PATENT DOCUMENTS

2015/0022732 A1* 1/2015 Park ........................ G06F 1/1652
349/12
2016/0093685 A1* 3/2016 Kwon .................... G06F 1/1652
257/40
(Continued)

FOREIGN PATENT DOCUMENTS

| CN | 103955310 A | 7/2014 |
| CN | 206162458 U | 5/2017 |

(Continued)

OTHER PUBLICATIONS

Apr. 4, 2019—(WO) International Search Report and Written Opinion Appn PCT/CN2019/070896 with English Translation.

*Primary Examiner* — Brian M Butcher
(74) *Attorney, Agent, or Firm* — Banner & Witcoff, Ltd.

(57) ABSTRACT

A touch panel and a method of manufacturing the same, an electronic device are provided. The touch panel includes a bending area bent along a bending axis. It further includes: a plurality of first touch electrodes extending along a first direction; a plurality of second touch electrodes extending along a second direction; and a metal mesh pattern at least provided in the bending area. The metal mesh pattern includes a first metal mesh line extending along the first direction and connected with the first touch electrode in parallel. The second direction intersects with the first direction.

15 Claims, 9 Drawing Sheets

(52) U.S. Cl.
CPC .............. *G06F 2203/04103* (2013.01); *G06F 2203/04111* (2013.01); *G06F 2203/04112* (2013.01)

(56) References Cited

U.S. PATENT DOCUMENTS

2016/0266691 A1* 9/2016 Jang ..................... H01L 27/323
2018/0097197 A1* 4/2018 Han ..................... G06F 1/1626

FOREIGN PATENT DOCUMENTS

| CN | 107450772 A | 12/2017 |
| CN | 107479753 A | 12/2017 |
| CN | 108932078 A | 12/2018 |

\* cited by examiner

TOUCH PANEL AND METHOD OF MANUFACTURING THE SAME, ELECTRONIC DEVICE

CROSS REFERENCE TO RELATED APPLICATIONS

The application is a U.S. National Phase Entry of International Application No. PCT/CN2019/070896 filed on Jan. 8, 2019, designating the United States of America and claiming priority to Chinese Patent Application No. 201810654214.9, filed on Jun. 22, 2018. The present application claims priority to and the benefit of the above-identified applications and the above-identified applications are incorporated by reference herein in their entirety.

TECHNICAL FIELD

Embodiments of the present disclosure relate to a touch panel, a method of manufacturing the same, and an electronic device.

BACKGROUND

User interface with touch function is widely used in various electronic devices, and with the development of flexible electronic technology, the flexible touch panel technology has also attracted industry attention. It has become a concern of people that how to form a flexible touch panel with high flexural endurance.

SUMMARY

Embodiments of the present disclosure provide a touch panel, comprising a bending area bent along a bending axis, the touch panel further comprising: a plurality of first touch electrodes extending along a first direction; a plurality of second touch electrodes extending along a second direction; a metal mesh pattern provided at least in the bending area, including a first metal mesh line. The first metal mesh line extends along the first direction and is connected with the first touch electrodes in parallel, and the second direction intersects with the first direction.

For example, a direction of the bending axis is parallel to the second direction, the metal mesh pattern comprises a plurality of the first metal mesh lines insulated from each other, the plurality of first metal mesh lines being respectively connected with the plurality of first touch electrodes in parallel.

For example, a direction of the bending axis is parallel to the first direction, at least one of the first touch electrodes is located in the bending area, and the first metal mesh line is connected with the at least one of the first touch electrodes in parallel.

For example, the first touch electrodes include a first touch electrode portion and a first connection line which are alternately connected, the second touch electrodes include a second touch electrode portion and a second connection line which are alternately connected; and the first touch electrode portion is provided in a same layer as the second touch electrode portion, and the first connection line and the second connection line are insulated from each other and overlapped with each other.

For example, the second touch electrode portion is provided in a same layer as the second connection line, and the touch panel further includes an insulating layer between the first touch electrode portion and the first connection line, the first touch electrode portion being electrically connected to the first connection line through a first via hole in the insulating layer.

For example, the first metal mesh line is provided in a same layer as the first connection line and is electrically connected to the first connection line, so as to be connected with the first touch electrode in parallel.

For example, the metal mesh pattern further comprises a second metal mesh line, and the second metal mesh line is configured as the first connection line.

For example, the first touch electrode portion is provided in a same layer as the first connection line, and the touch panel further includes an insulating layer between the second touch electrode portion and the second connection line, the second touch electrode portion being electrically connected to the second connection line through a first via hole in the insulating layer.

For example, the first metal mesh line is provided in a same layer as the second connection line and insulated from the second connection line, and is connected with the first touch electrodes in parallel through a second via hole in the insulating layer.

Embodiments of the present disclosure also provide an electronic device, comprising the touch panel.

For example, the electronic device further comprises a display panel, the touch panel being stacked with the display panel.

Embodiments of the present disclosure also provide a method of manufacturing a touch panel, the touch panel comprising a bending area, the manufacturing method comprising: forming a plurality of first touch electrodes extending along a first direction; forming a plurality of second touch electrodes extending along a second direction; and forming a metal mesh pattern in the bending area. The metal mesh pattern includes a first metal mesh line, the first metal mesh line extending along the first direction and being connected with the first touch electrodes in parallel, and the second direction intersecting with the first direction.

For example, the first touch electrode comprises a first touch electrode portion and a first connection line which are alternately connected, the first metal mesh line and the first connection line being formed in a single patterning process and being electrically connected with each other.

For example, the metal mesh pattern further comprises a second metal mesh line, the second metal mesh line being formed as the first connection line.

For example, the second touch electrode comprises a second touch electrode portion and a second connection line which are alternately connected, the metal mesh pattern and the second connection line are formed in a same patterning process and insulated from each other.

For example, the manufacturing method further comprises: forming an insulating layer between the metal mesh pattern and the second touch electrode portion, and forming a first via hole in the insulating layer. The second touch electrode portion is electrically connected to the second connection line through the first via hole.

For example, forming a second via hole in the insulating layer while the first via hole is formed, the first metal mesh line being connected with the first touch electrode in parallel through the second via hole.

BRIEF DESCRIPTION OF THE DRAWINGS

A brief description will be given below to the accompanying drawings of the embodiments to provide a more clear understanding of the technical proposals of the embodiments of the present disclosure. Apparently, the drawings described below only involve some embodiments of the present disclosure but are not intended to limit the present disclosure.

DETAILED DESCRIPTION

The technical solutions of the embodiments will be described in a clearly and completely way in connection with the drawings related to the embodiments of the disclosure. Apparently, the described embodiments are just a part but not all of the embodiments of the disclosure. Based on the described embodiments herein, one of ordinary skill in the art can obtain other embodiment(s), without any creative labor, which shall be within the scope of the present disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, 'on,' 'under,' 'left,' 'right,' or the like are only used to indicate relative position relationship, and when the absolute position of the object which is described is changed, the relative position relationship may be changed accordingly.

At present, the flexible touch technology mainly uses a transparent conductive metal oxide material (such as ITO) as the touch electrode material. However, the metal oxide material is brittle, and is susceptible to cracking due to bending stress in the flexible touch bending area, which greatly reduces the performance and yield of flexible touch products.

Figure 1:
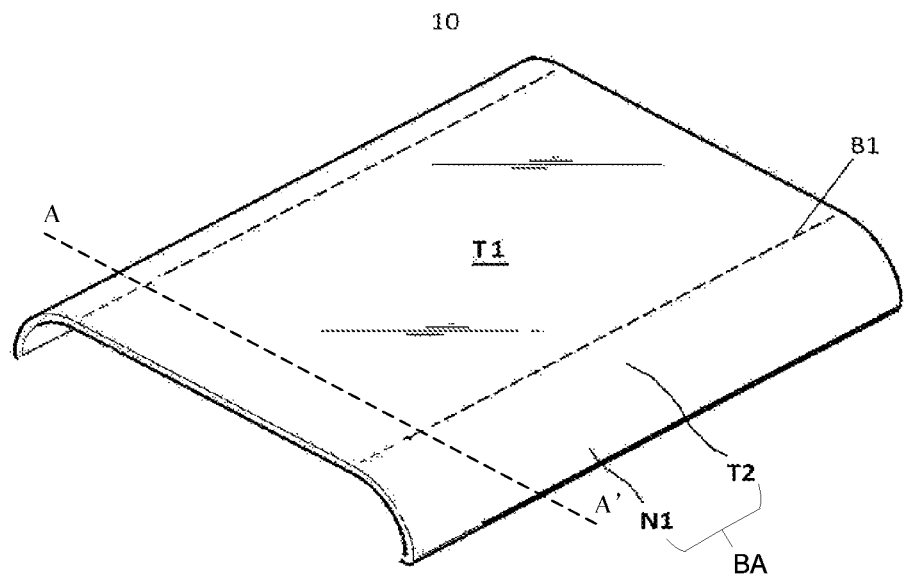
FIG. 1 is a perspective view of a touch panel provided by an embodiment of the present disclosure.

FIG. 1 is a perspective view of a touch panel 10 provided by an embodiment of the present disclosure, for example, the touch panel 10 can be applied to an electronic device, such as a mobile phone, or a tablet computer. As shown in FIG. 1, the touch panel 10 includes a first touch area T1 and a bending area BA bent along a first bending axis B1. The first touch area T1 is generally planar, and may be a main touch area of the touch panel 10. A second touch area T2 and the non-touch area N1 are disposed in the bending area BA.

For example, the bending area BA may be distributed on the left side and right side of the first touch area T1, or on the upper side and lower side, or in the case where the first touch area T1 is rectangular, it is only distributed on one side of the first touch area T1 of the rectangle.

In another embodiment, the touch panel may include, for example, two first touch areas and a bending area bent along a first bending axis, and the bending area is located between the two first touch areas. For example, the bending area is in the middle of the touch panel, and the two first touch areas are located in different planes.

Figure 2:
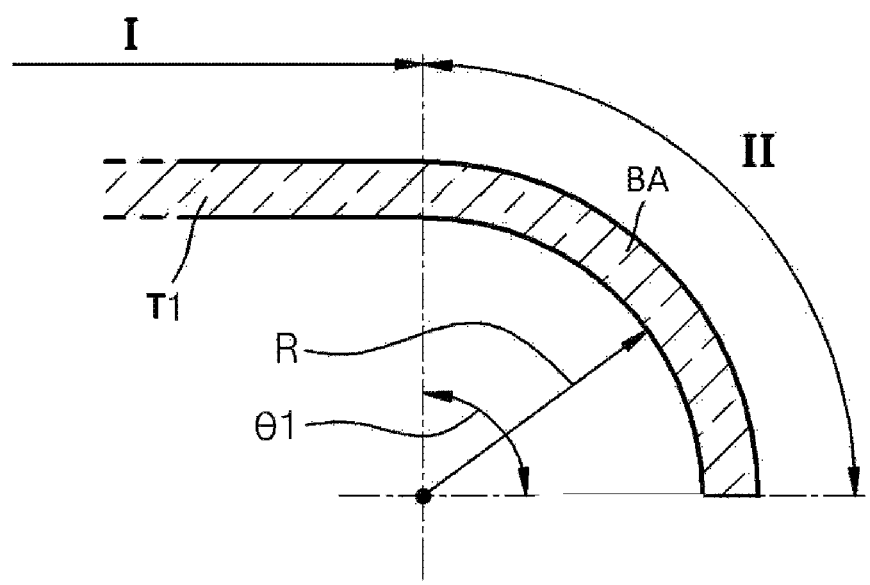
FIG. 2 is a schematically sectional view illustrating a relationship between a first touch area and a bending area of a touch panel provided by an embodiment of the present disclosure.

FIG. 2 is a schematically sectional view taken along line A-A' of FIG. 1, illustrating the relationship between the first touch area T1 and the bending area BA of the touch panel shown in FIG. 1 provided by an embodiment of the present disclosure. As shown in the figure, the first touch area T1 is located in the first area I, and the bending area BA is located in the second area II. A normal of surface of the bending area BA and a normal of surface of the first touch area T1 face different directions, and the bending area BA is formed as a curved surface. For example, the sectional shape of the bending area BA is arc-liked, for example, it may be a part of the circumference. For example, as shown in the figure, the bending area BA is formed to have a sectional shape of a quarter of a circumference with a predetermined curvature radius of R, that is, a central angle $\theta_1$ is 90°. The touch panel can be made to have a better grip feeling and aesthetics appearance by selecting appropriate values of R and $\theta_1$.

Figure 3A:
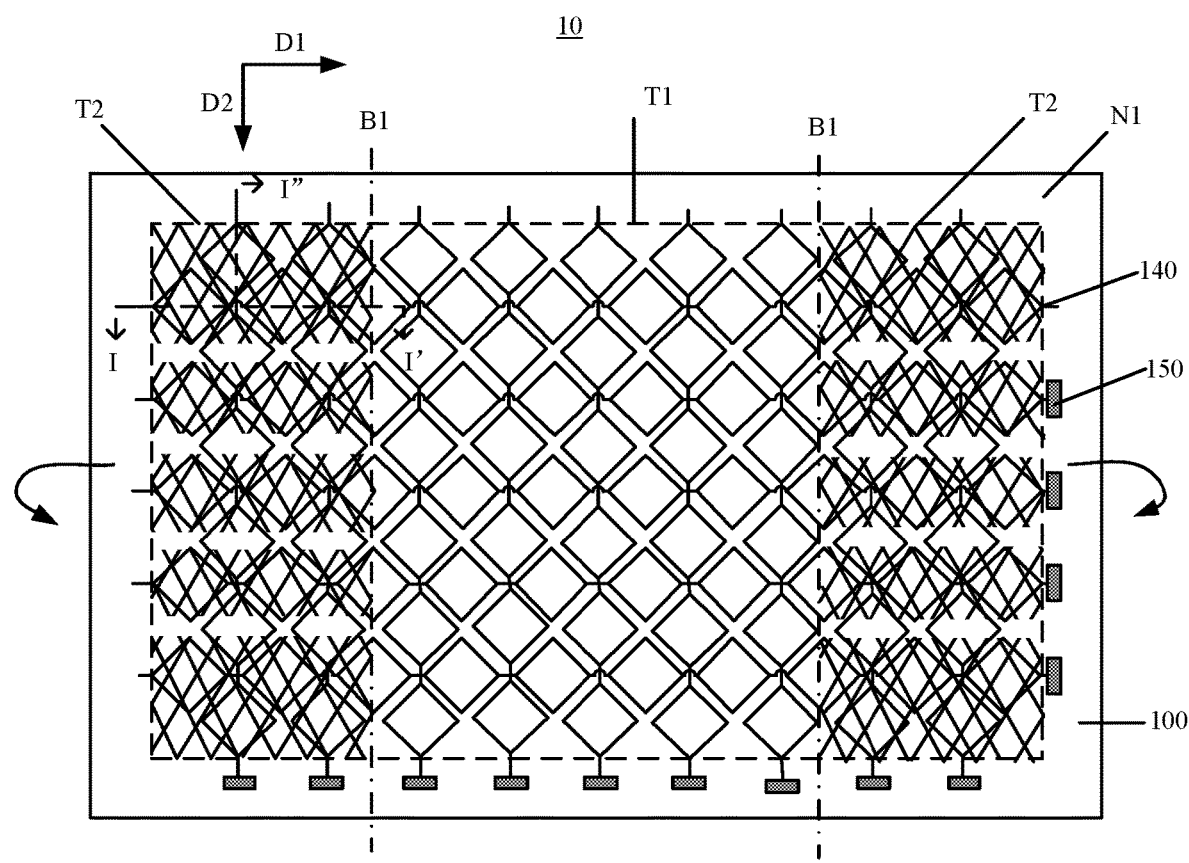
FIG. 3A is a schematic plan view illustrating a touch panel in an unfolded state provided by an embodiment of the present disclosure.
Figure 3B:
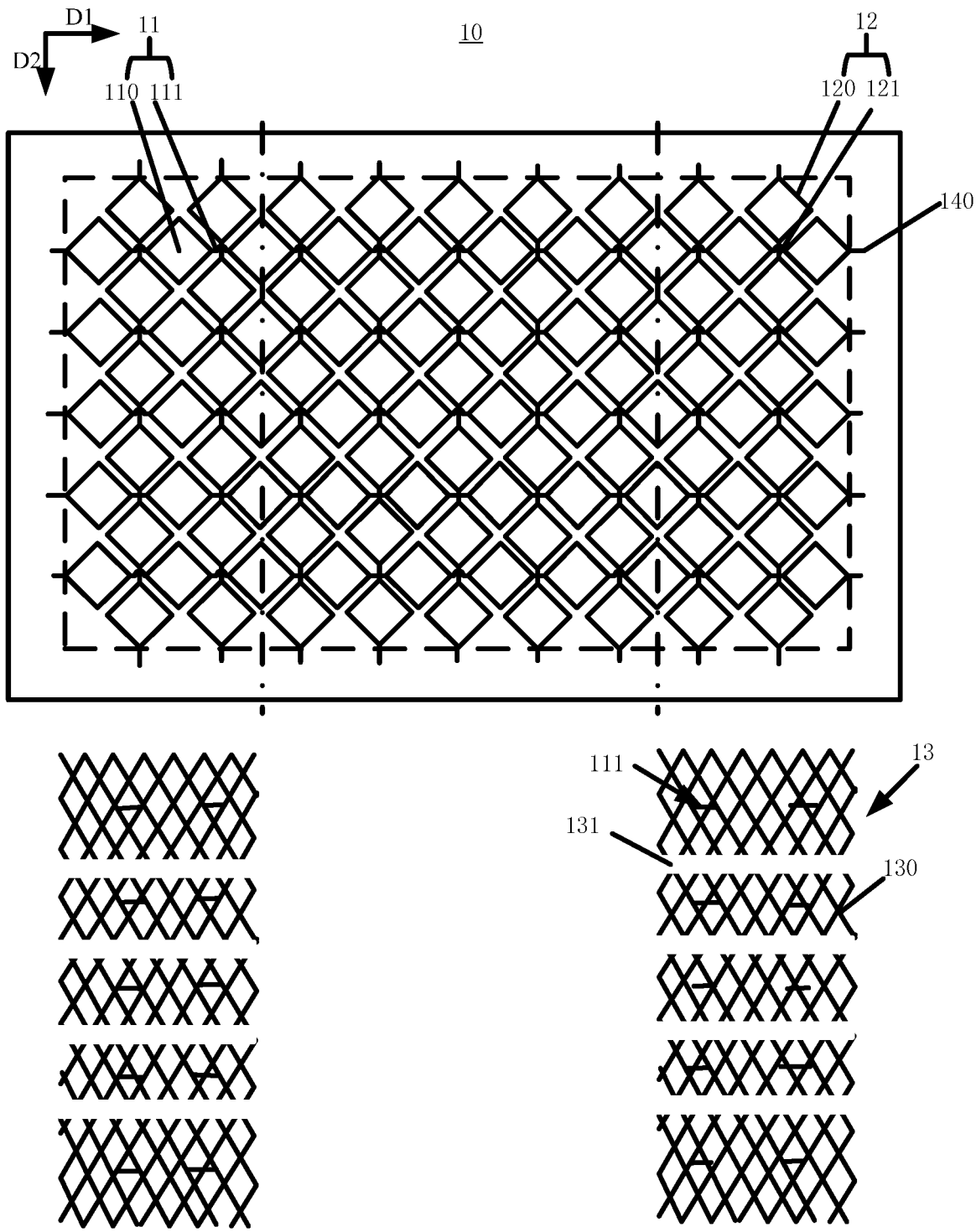
FIG. 3B is an exploded perspective view of the touch panel of FIG. 3A.

FIG. 3A is a schematic plan view illustrating a touch panel in an unfolded state provided by an embodiment of the present disclosure, and FIG. 3B is an exploded view of the touch panel of FIG. 3A (bonding pads are not shown). As shown in the figure, the touch panel 10 includes a substrate 100, a plurality of first touch electrodes 11 and a plurality of second touch electrodes 12 disposed on the substrate 100. The first touch electrodes 11 extend along a first direction D1 (for example, a length direction of the rectangular touch panel in the drawing), and the second touch electrodes 12 extend along a second direction D2 (for example, a width direction of the rectangular touch panel in the drawing). The first direction D1 and the second direction D2 intersects with each other, for example, they insects with each other orthogonally. The first touch electrodes 11 include a first touch electrode portion 110 and a first connection line 111 which are alternately connected. The second touch electrodes 12 include a second touch electrode portion 120 and a second connection line 121 which are alternately connected. The first connection line 111 and the second connection line 121 intersect and overlap with each other in a direction perpendicular to the board surface of the substrate 100. Bonding pads 150 are disposed in the non-touch area N1 for bonding with a touch integrated circuit (not shown). Each of the first touch electrodes 11 and the second touch electrodes 12 are connected to the corresponding bonding pads 150 through traces 140, so that signal transmission between the touch panel 10 and the touch integrated circuit can be realized. For example, the touch integrated circuit is a touch chip, and it provides a touch driving signal for the touch panel 10 and receives and processes the touch sensing signal output by the touch panel 10 to implement the touch sensing function.

For example, the first touch electrodes 11 and the second touch electrodes 12 are distributed over the entire touch area of the touch panel 10, that is, the first touch area T1 and the second touch area T2 in the bending area BA. For example, the direction of the first bending axis B1 is parallel to the second direction D2. For example, the bending area BA is disposed on the left side and right side of the first touch area T1.

For example, the first touch electrodes 11 are touch driving electrodes, and the second touch electrodes 12 are touch sensing electrodes; or the first touch electrodes 11 are touch sensing electrodes, and the second touch electrodes 12 are touch driving electrodes. The first touch electrodes 11 and the second touch electrodes 12 form a mutual capacitance with each other. A driving signal is applied to a touch electrode used as a touch driving electrode, and when a target object (such as a finger or a stylus) approaches or contacts the touch panel, a touch electrode used as a touch sensing electrode senses a change in the capacitance value and outputs a corresponding electrical signal, so that an input signal, such as a touch signal or a gesture signal, can be detected, and the touch sensing function is realized.

The touch panel 10 further includes a metal mesh pattern 13 disposed at least in the bending area BA. The metal mesh pattern 13 includes at least one first metal mesh line 130, which is connected with the first touch electrode 11, or the second touch electrode 12 in the bending area BA in parallel.

The metal mesh pattern 13 is disposed in the bending area BA, and the metal mesh pattern has good ductility and flexibility, and can enhance the bending resistance and workability of the touch panel 10 (especially the bending area). In addition, the metal mesh pattern can achieve shielding of noise electromagnetic signal for the touch area, and improve the signal anti-interference ability of the bending area of the touch panel 10. Moreover, because the metal mesh lines are connected with the touch electrodes in parallel, the impedance of the touch electrodes can be reduced, and the sensitivity of the touch panel is improved.

For example, the metal mesh pattern 13 may be disposed only in the bending area BA, or may extend to the first touch area T1, which is not limited in the embodiment of the present disclosure. For example, the metal mesh pattern is disposed on the second touch area T2, and the arrangement manner of the metal mesh pattern and the manner of parallel connection with the first touch electrodes 11 or the second touch electrodes 12 are exemplarily illustrated in the following description.

In an example, as shown in FIGS. 3A and 3B, the metal mesh pattern 13 includes a plurality of first metal mesh lines 130 extending along the first direction D1 and insulated from each other. For example, the adjacent first metal mesh lines 130 are insulated by a dummy area 131. For example, the dummy area may also include a dummy line that is not connected to an electrical signal. The shape and pattern of the dummy area are not limited in the embodiment of the present disclosure.

Figure 4A:
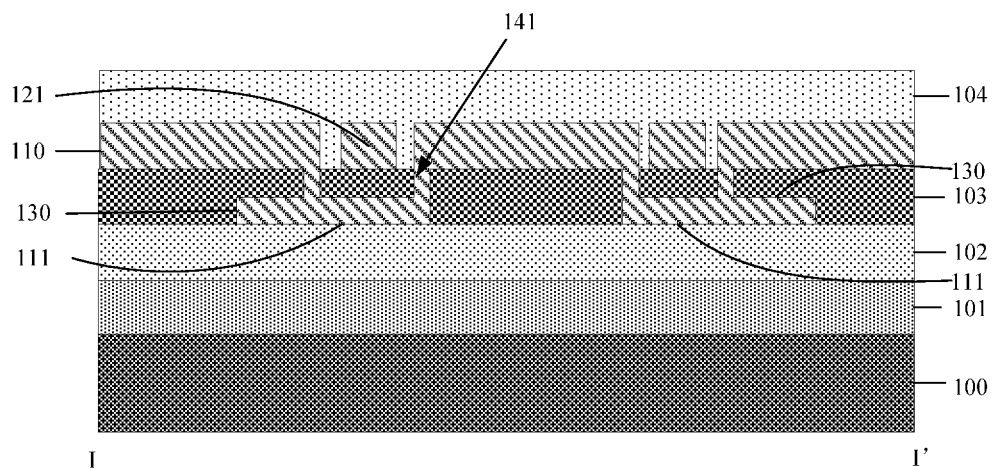
FIG. 4A illustrates an example of a sectional view of the touch panel of FIG. 3A taken along a direction of line I-I'.

For example, the plurality of first metal mesh lines 130 are disposed in one-to-one correspondence with the plurality of first touch electrodes 11 and are connected with each other in parallel. For example, the first metal mesh lines 130 and the first touch electrodes 11 are stacked in a direction perpendicular to the substrate 100. For example, each of the first metal mesh lines 130 overlaps with the corresponding first touch electrode 11 in a direction perpendicular to the substrate 100. FIG. 4A illustrates an example of a sectional view of the touch panel of FIG. 3A taken along a direction of line I-I'. For example, as shown in the figure, the first touch electrode portion 110 of the first touch electrode 11 is disposed in the same layer as the second touch electrode portion 120 and the second touch connection line 121 of the second touch electrode 12. The touch panel 10 further includes an insulating layer 103 disposed between the first touch electrode portion 110 of the first touch electrode 11 and the first connection line 111. The first touch electrode portion 110 and the first connection line 111 are electrically connected through the first via hole 141 disposed in the insulating layer 103 to form a bridge structure. For example, the first metal mesh line 130 is disposed in the same layer as and electrically connected to the first connection line 111, so as to be connected with the first touch electrode 11 in parallel. For example, the metal mesh pattern 13 is also disposed in the same layer as the traces 140. For example, the metal mesh pattern 13 may further include a second metal mesh line, which is configured as the first connection line 111, that is, the first connection line 111 is a portion of the metal mesh pattern 13. For example, the first connection line 111 is a portion of the first metal mesh line 130, that is, a portion of the first metal mesh line 130 serves as the first connection line 111. For example, each of the first metal mesh lines 130 forms at least two spaced contact points with the first connection lines 111, so as to form a parallel connection structure.

It is noted that "provided/disposed in a/the same layer" in the present disclosure refers to that two or more structures are formed on a same substrate, subjected to a same deposition process and a same patterning process, and thus the material of the two or more structures is the same.

For example, the substrate 100 may be formed of a plastic material with excellent heat resistance and durability, such as polyimide (PI), polycarbonate (PC), polyacrylate, polyarylate, polyetherimide, polyethersulfone, polyethylene terephthalate (PET), polyethylene (PE), polypropylene (PP), polysulfone (PSF), polymethyl methacrylate (PMMA), cellulose triacetate (TAC), cycloolefin polymer (COP), cyclic olefin copolymer (COC) and so on.

For example, the first touch electrode portion 110 and the second touch electrode portion 120 may be formed of a transparent conductive material, which includes, for example, transparent conductive metal oxide material, such as indium tin oxide (ITO), indium zinc oxide (IZO), zinc oxide (ZnO), zinc aluminum oxide (AZO), indium gallium zinc oxide (IGZO), etc.

For example, the material of the metal mesh pattern 13 is, for example, a metal material, or an alloy material, such as aluminum, molybdenum, copper, silver, etc. For example, the material of the metal mesh pattern 13 is a silver palladium copper alloy (APC) material. For example, the metal mesh pattern 13 is formed by intersecting metal mesh lines arranged in parallel with each other, the metal mesh lines having a diameter of less than 5 μm and adjacent metal mesh lines having a parallel pitch of more than 1 mm.

For example, in an example, the touch panel 10 further includes an index margin layer 102 disposed between the substrate 100 and the metal mesh pattern 13. For example, the index margin layer is disposed to reduce the difference in light reflectivity between the transparent electrode area and the non-transparent electrode area, so that the lines of transparent electrodes fade after etching to improve the visual effect. For example, the material of the index margin layer 102 is, for example, a stacked structure of cerium oxide ($Nb_2O_5$) and silicon oxide.

For example, in an example, the touch panel 10 further includes a hard coating layer 101 disposed between the substrate 100 and the index margin layer 102. The hard coating layer can provide a flat interface for the formation of the touch structure. For example, the material of the hard coating layer is a transparent insulating material formed by curing of an organic material. For example, the material of the hard coating layer is a transparent optical adhesive. For example, the organic material is, for example, at least one of polyimide (PI), acrylate, and epoxy resin.

For example, in an example, the touch panel 10 further includes a protective layer 104 covering the first touch electrodes 11 and the second touch electrodes 12. For example, the protective layer is a transparent OCA optical adhesive.

Figure 4B:
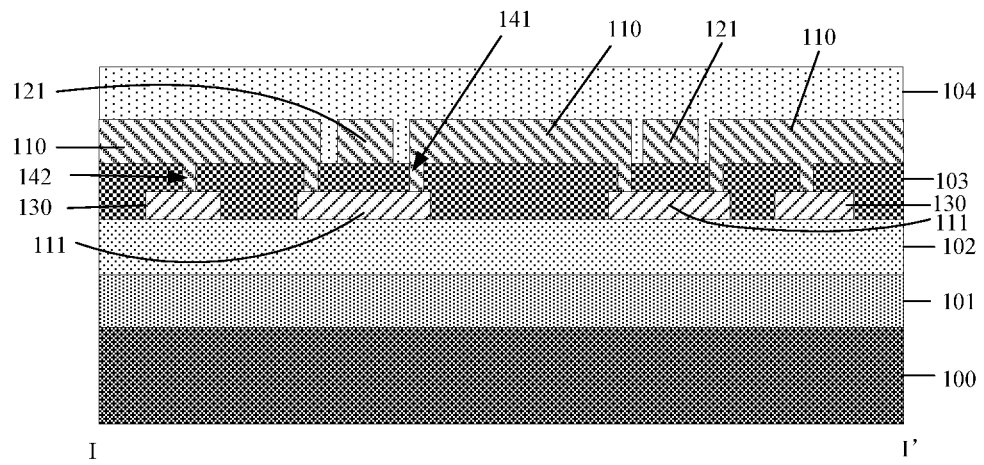
FIG. 4B illustrates another example of a sectional view of the touch panel of FIG. 3A taken along a direction of line I-I'.

FIG. 4B illustrates another example of a sectional view of the touch panel of FIG. 3A taken along a direction of line I-I'. The first touch electrode 11 can also be electrically connected to the first metal mesh line 130 through the second via hole 142 disposed in the insulating layer 103 to form a parallel connection structure. As shown in FIG. 4B, the first touch electrode portion 110 is electrically connected to the first metal mesh line 130 through the second via hole 142 in the insulating layer 103. For example, each of the first metal mesh lines 130 is electrically connected to at least two first touch electrode portions 110 to form a parallel connection structure. For example, in order to obtain a better effect of parallel connection, the first metal mesh lines 130 are electrically connected with the first first touch electrode portion 110 and the last first touch electrode portion 110 located within a span range of the first metal mesh line (overlapping with the first metal mesh line in a direction perpendicular to the substrate), respectively.

Figure 4C:
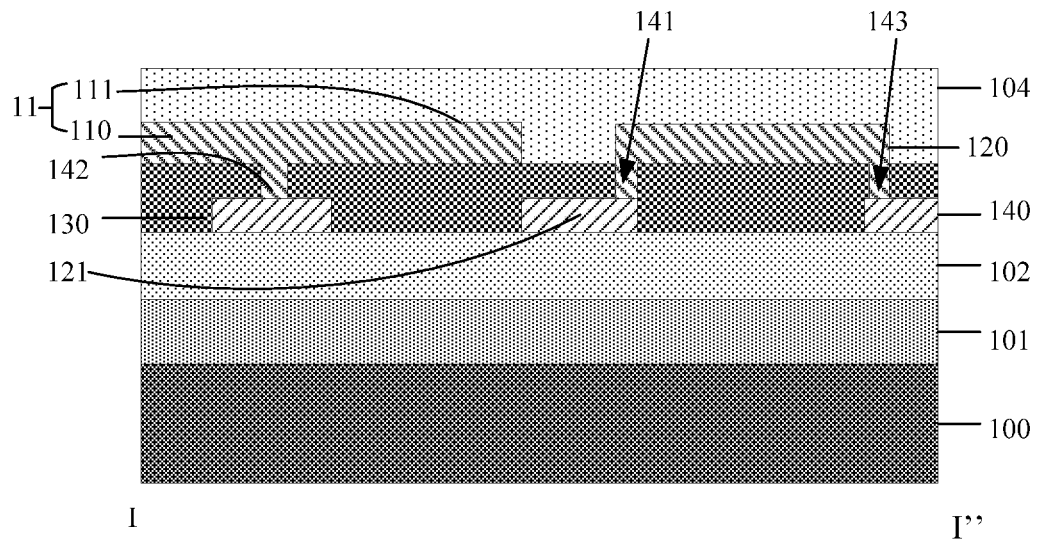
FIG. 4C illustrates an example of a sectional view of the touch panel of FIG. 3A taken along a direction of line I-I"

FIG. 4C illustrates an example of a sectional view of the touch panel of FIG. 3A taken along a direction of line I-I". As shown, the first touch electrode portion 110 of the first touch electrode 11 is disposed in a same layer as the first touch line 111 and the second touch electrode portion 120 of the second touch electrode 12. The touch panel 10 further includes an insulating layer 103 disposed between the second touch electrode portion 120 and the second connection line 121 of the second touch electrode 12. The second touch electrode portion 120 and the second connection line 121 are electrically connected through the first via hole 141 disposed in the insulating layer 103 to form a bridge structure. The first touch electrode 11 is electrically connected to the first metal mesh line 130 through the second via hole 142 disposed in the insulating layer 103 to form a parallel connection. For example, the first touch electrode portion 11 of the first touch electrode 11 and/or the first connection line 110 is electrically connected to the first metal mesh line 130 through the second via hole 142.

Figure 5A:
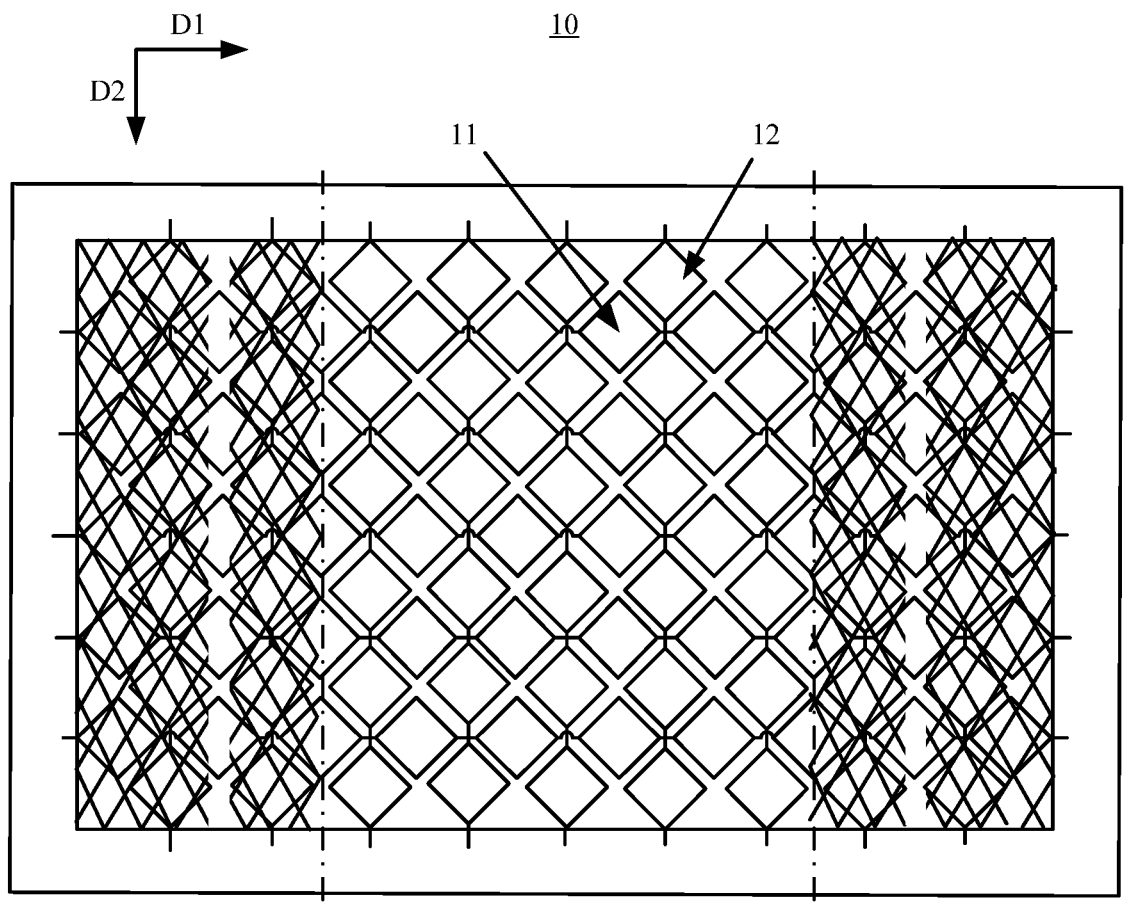
FIG. 5A is a schematic plan view illustrating a touch panel in an unfolded state provided by another embodiment of the present disclosure.
Figure 5B:
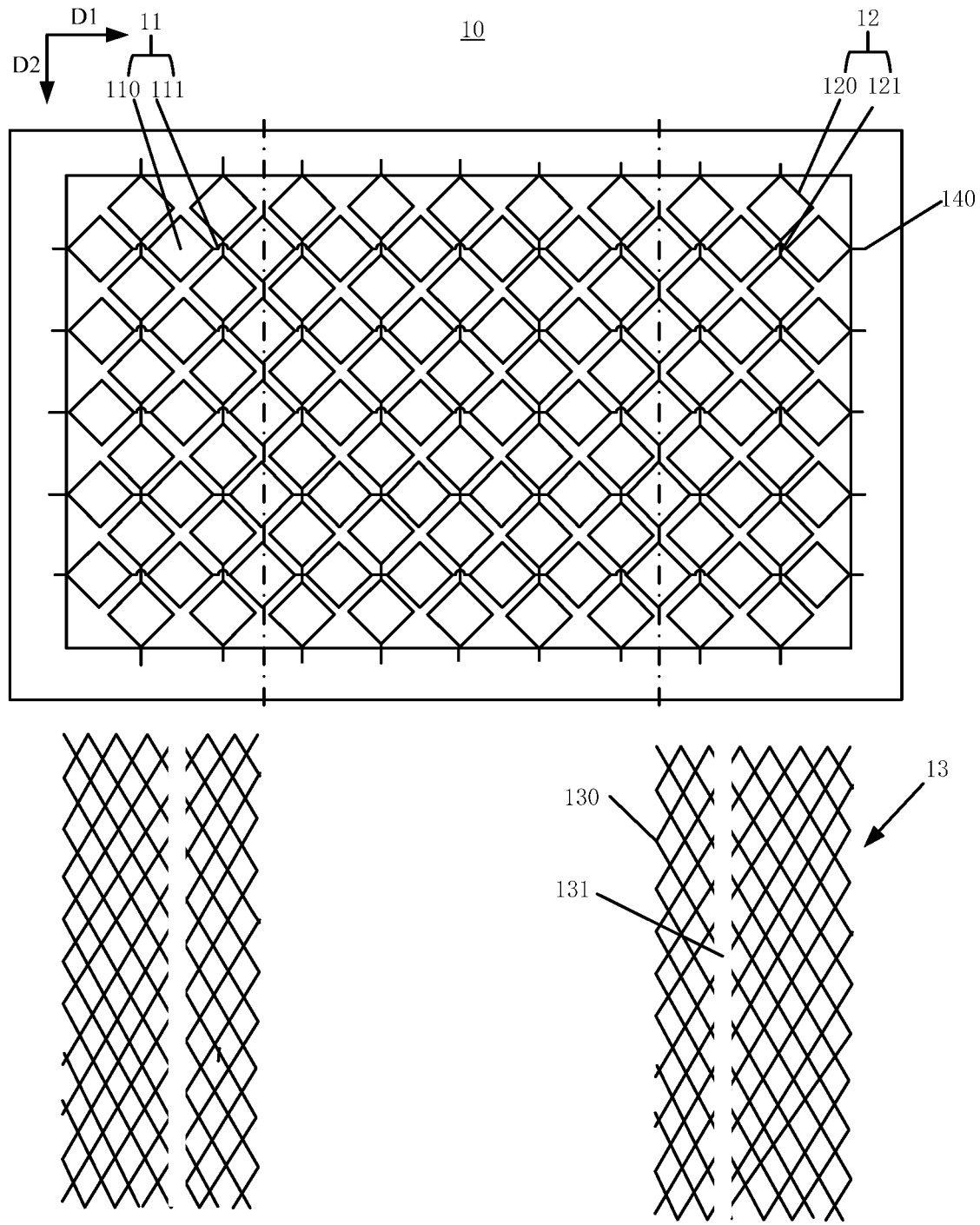
FIG. 5B is an exploded perspective view of the touch panel of FIG. 5A.

FIG. 5A is a schematic plan view illustrating a touch panel in an unfolded state provided by another embodiment of the present disclosure, and FIG. 5B is an exploded view of the touch panel of FIG. 5A. As shown in the figure, the first metal mesh line 130 extends in the second direction D2 and is connected with the at least one second touch electrode 12 located in the bend area BA in parallel. For example, the number of the first metal mesh lines 131 is the same as the number of the second touch sensing electrodes 12 located in the bending area BA, and each of the first metal mesh lines 131 is disposed in one-to-one correspondence and connected with the second touch sensing electrodes 12 located in the bending area BA in parallel. For example, the length of the first touch area T1 along the first direction D1 is 1 cm, and in the first direction D1, two second touch electrodes 12 are disposed in the bending area BA. For example, the adjacent first metal mesh lines 130 are insulated from each other by a dummy area 131.

It is noted that the "first direction" and the "second direction" in the present disclosure are only used for differentiation and may be exchanged; the "first touch electrode" and the "second touch electrode" in the present disclosure may also be exchanged. For example, the embodiment shown in FIG. 5A can also be described as follows: the direction of the bending axis of the touch panel is parallel to the first direction, and the first touch electrode and the first metal mesh line extend in the first direction and are connected with each other in parallel. The two touch electrodes extend in the second direction. One difference between the touch panel in this embodiment and the touch panel shown in FIG. 4A is that the direction of the bending axis of the touch panel is parallel to the extending direction of the first metal mesh line.

For example, each of the first metal mesh lines 130 has a length substantially same as that of the second touch electrode 12 connected therewith in parallel.

Figure 6:
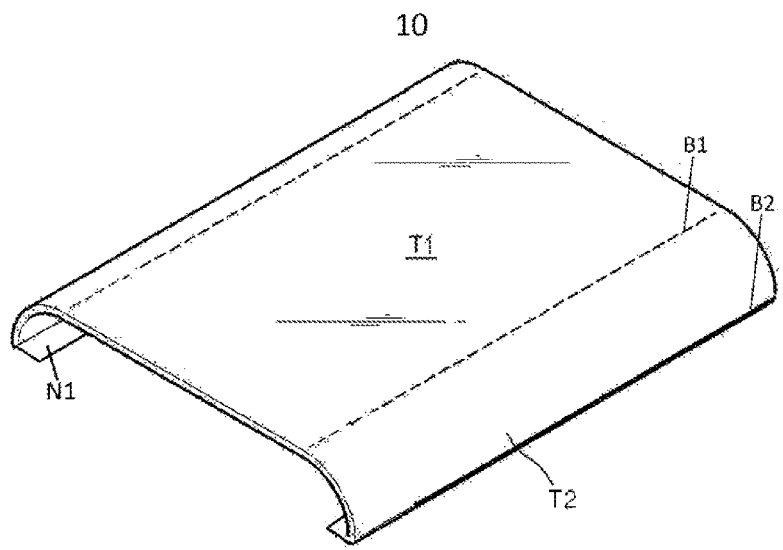
FIG. 6 is a perspective view of a touch panel provided by another embodiment of the present disclosure.

FIG. 6 is a perspective view of a touch panel provided by another embodiment of the present disclosure. In this example, the touch panel 10 further has a second bending axis B2, the non-touch area N1 is bent along the second bending axis B2 to the back surface of the touch panel 10. For example, the second bending axis B2 is parallel to the first bending axis B1. For example, the non-touch area N1 is parallel to the first touch area T1. In this way, a narrow bezel or even a non-bezel touch panel structure can be realized without reducing the wiring area of the non-touch area N1.

Figure 7A:
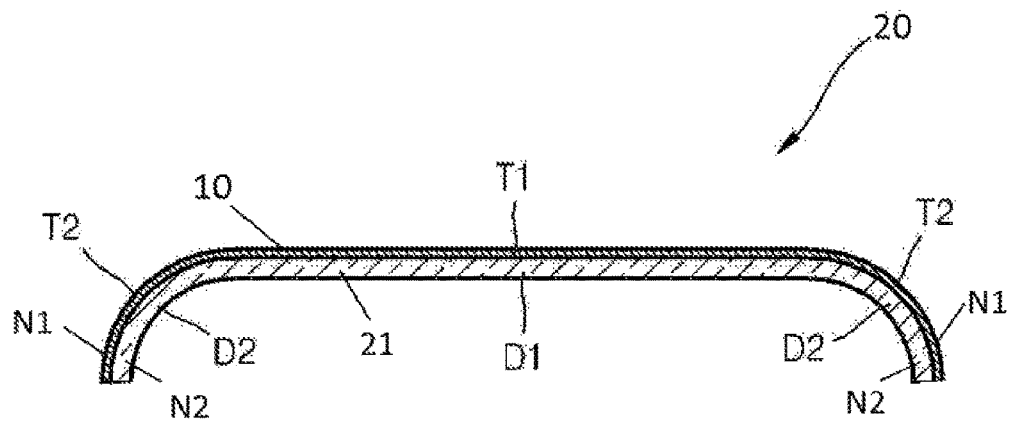
FIG. 7A-7B are sectional views of an electronic device provided by an embodiment of the present disclosure.

An embodiment of the present disclosure further provides an electronic device including the touch panel 10 described above. FIG. 7A is a sectional view of an electronic device provided by an embodiment of the present disclosure. For example, the electronic device is a touch display panel 20, which further includes a display panel 21, and the display panel 21 and the touch panel 10 are stacked. The display panel 21 includes a first display area D1, a second display area D2, and a non-display area N2. The first display area D1 and the first touch area N1 are aligned with each other so as to correspond with each other. The second display area D2 and the second touch area T2 are aligned with each other so as to correspond with each other. The non-display area N2 and the non-touch area T2 are aligned with each other so as to correspond with each other. The display panel 21 and the touch panel 10 are fixed to each other, for example, by an adhesive, or integrally formed, i.e. the touch panel 10 is directly formed on the display panel 21 by using the display panel 21 as a base substrate.

Figure 7B:
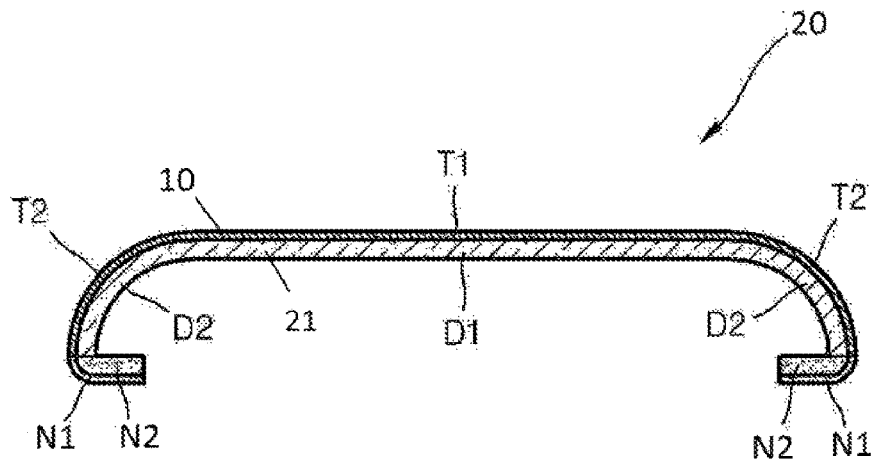

In another example, as shown in FIG. 7B, the non-display area N2 of the display panel 21 and the non-touch area N1 of the touch panel 10 are both bent to the back surface of the touch display panel 20, so as to achieve a display effect of narrow bezel or even non-bezel.

For example, the display panel 21 may be a liquid crystal display panel, an organic light-emitting-diode display panel, or an electronic paper display panel.

For example, in order to achieve the display effect, the substrate 100, the hard coating layer 101, the index margin layer 102, the insulating layer 103, the first touch electrodes 11, the second touch electrodes 12, and the protective layer 104 in the touch panel 10 are all transparent.

The embodiment of the present disclosure also provides a method of manufacturing the touch panel. The method includes at least the following steps: forming a plurality of first touch electrodes extending along a first direction; forming a plurality of second touch electrodes extending along a second direction; and forming a metal mesh pattern in the bending area, the metal mesh pattern including a first metal mesh line extending along the first direction and connected with the first touch electrodes in parallel, and the second direction intersecting the first direction.

The method of manufacturing the touch panel provided by the embodiment of the present disclosure and modified embodiment thereof will be exemplarily described below with reference to FIGS. 3A-3B, 4A-4C, and 8A-8G. For the convenience of description, FIGS. 8A-8G only show schematic views of a portion of the bending area of the touch panel 10.

In an example, the manufacturing method includes the following steps S801-S803.

Figure 8A:
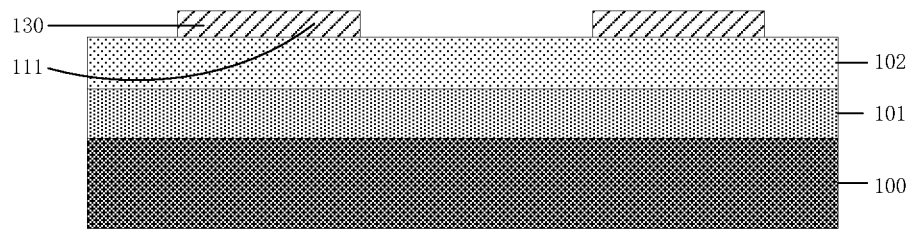
FIG. 8A-8G are steps diagrams of a method of manufacturing a touch panel provided by embodiments of the present disclosure and modified embodiments thereof.

Step S801: as shown in FIG. 8A, a metal mesh pattern 13 and a first connection line 111 are formed on the substrate 100. For example, the metal mesh pattern 13 is formed at least in the bending area of the touch panel, and the first connection line 111 is distributed throughout the touch area. The metal mesh pattern 13 includes a first metal mesh line 130 that is electrically connected to the first connection line 111.

For example, the first conductive layer is formed and the metal mesh pattern 13 and the first connection line 111 connected to each other is formed by patterning the first conductive layer. For example, the material of the conductive layer is a metal material or an alloy material, such as aluminum, molybdenum, copper, silver, etc. For example, the material of the first conductive layer is a silver palladium copper alloy (APC) material. For example, the patterning process is a conventional photolithography process, including steps of coating, exposing, developing, drying, etching, etc. of the photoresist.

For example, referring to FIG. 3B together, the metal mesh pattern 13 includes a plurality of first metal mesh lines 130 extending along the first direction D1 and insulated from each other. For example, the adjacent first metal mesh lines 130 are insulated fro each other by a dummy area 131. For example, the dummy area includes a dummy line that is not connected to an electrical signal. The shape and pattern of the dummy area are not limited in the embodiment of the present disclosure.

For example, a plurality of spaced first connection lines 111 are formed at predetermined positions according to design parameters of the touch electrodes. For example, each of the first metal mesh lines 130 forms contact points with the at least two first connection lines 111 to form a parallel connection structure with the touch electrodes.

For example, in a modified embodiment of the embodiment, the metal mesh pattern 13 may further include a second metal mesh line formed as the first connection line 111.

For example, the metal mesh pattern 13 and the first connection line 111 are formed while the traces 140 in the non-touch area N1 are formed.

For example, the hard coating layer 101 and the index margin layer 102 may be sequentially formed between the substrate 100 and the metal mesh pattern 13.

For example, the substrate 100 may be formed of a plastic material with excellent heat resistance and durability, such as, polyimide (PI), polycarbonate (PC), polyacrylate, polyarylate, polyetherimide, polyethersulfone, polyethylene terephthalate (PET), polyethylene (PE), polypropylene (PP), polysulfone (PSF), polymethyl methacrylate (PMMA), cellulose triacetate (TAC), cycloolefin polymer (COP), and cyclic olefin copolymer (COC), etc. Alternatively, the substrate 100 may be a flexible display panel itself. In this case, the touch electrodes are directly formed on the surface of the flexible display panel to obtain an integrated flexible touch display panel.

For example, forming the hard coating layer 101 includes: forming an organic material layer on the substrate 100 and then curing the organic material layer. For example, the material of the hard coating layer is an optical adhesive. For example, the organic material is, for example, at least one of polyimide (PI), acrylate, and epoxy resin. For example, the curing process is UV light curing.

For example, the index margin layer 102 is formed using a sputtering process. For example, the niobium target and the silicon target are respectively used and continuously sputtered by oxygen gas to obtain the index margin layer 102 including a composite layer structure of a niobium oxide layer and a silicon oxide layer. For example, the thickness of the niobium oxide layer and the silicon oxide layer is adjusted by adjusting process conditions, such as sputtering power, pressure, temperature, etc.

Figure 8B:
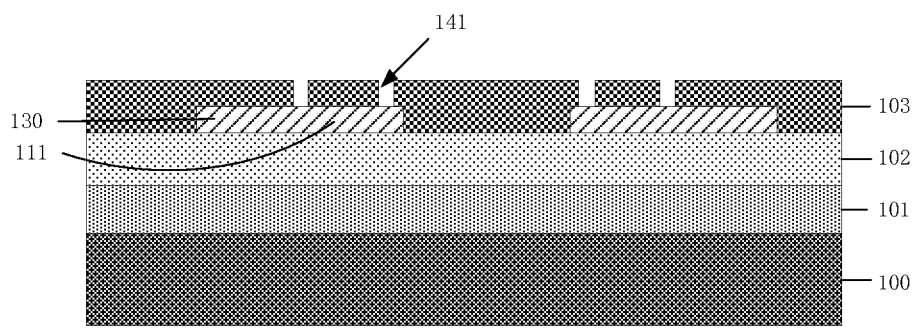

Step S802: as shown in FIG. 8B, an insulating layer 103 is formed and a first via hole 141 is formed in the insulating layer. The first via hole 141 is formed corresponding to the first connection line 111 and exposes a portion of the first connection line 111. For example, each of the first connection lines 111 corresponds to form two first via holes 141. For example, a third via hole (not shown) is formed in the insulating layer 103 while the first via hole(s) 141 is/are formed, and the third via hole exposes a portion of the traces 140.

For example, the material forming the insulating layer 103 is an organic insulating material to obtain good flexural endurance. For example, the organic insulating material is a transparent material. For example, the organic insulating material is an OCA optical adhesive. For example, the organic insulating material may include polyimide (PI), acrylate, epoxy resin, polymethyl methacrylate (PMMA), etc.

For example, the material forming the insulating layer is a photosensitive material, and forming the insulating layer in this case includes: forming a photosensitive material layer, exposing and developing the photosensitive material layer to form a first via hole(s) 141, and then drying and curing it to form an insulating layer 103.

Figure 8C:
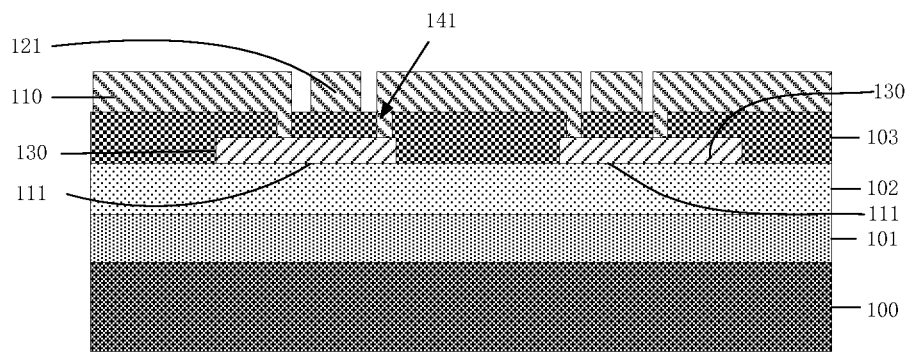

Step S803: as shown in FIG. 8C, the first touch electrode portion 110 and the second touch electrode 12 are formed.

For example, a second conductive layer is formed on the insulating layer 103, and the first touch electrode portion 110 and the second touch electrode 12 insulated from each other are formed by patterning the second conductive layer.

Referring to FIG. 3B together, the first touch electrode portion 110 is formed between each of the two first connection lines 111 correspondingly and is electrically connected to the two first connection lines 111 through the first via hole 141, such that a plurality of first touch electrodes 11 extending along the first direction D1 are formed. For example, the first touch electrode portion 110 and the second touch electrode 12 are electrically connected to the traces 140 through the third via hole. The second touch electrode 12 extends along the second direction D2 and includes a plurality of second touch electrode portions 120 and second connection lines 121 that are alternately connected. The first connection line 111 and the second connection line 121 intersect and overlap with each other in a direction perpendicular to the substrate 100.

For example, the material of the second conductive layer is a transparent conductive material, and the transparent conductive material includes, for example, transparent conductive metal oxide material, such as indium tin oxide (ITO), indium zinc oxide (IZO), zinc oxide (ZnO), zinc aluminum oxide (AZO), indium gallium zinc oxide (IGZO), etc.

In this way, the touch electrode structure of the touch panel 10 as shown in FIG. 4A is formed.

For example, the method of manufacturing the touch panel may further include: forming a protective layer 104 covering the touch electrode structure. For example, the material of the protective layer is a transparent optical adhesive.

For example, the method of manufacturing the touch panel may further include: forming a bending area BA and a first touch area T1 (referring to FIG. 1), and the bending area BA is bent along the first bending axis B1 with respect to the first touch area T1 to form a curved surface structure. For example, in this step, the bending area BA is formed to be a portion of a circumference having a sectional shape with a predetermined radius of curvature. A better grip feeling and aesthetic appearance can be obtained by selecting an appropriate radius of curvature.

For example, the method of manufacturing the touch panel further includes: bending the non-touch area N1 along the second bending axis B2 (referring to FIG. 6) to the back surface of the touch panel 10. For example, the non-touch area N1 is parallel to the first touch area T1. In this way, a narrow bezel or even a non-bezel touch panel structure can be realized without reducing the wiring area of the non-touch area N1.

In the above manufacturing method, because the metal mesh pattern 13 is formed in the bending area BA, the metal mesh pattern has good ductility and flexibility, and the bending resistance and workability of the touch panel 10 can be enhanced. In addition, the metal mesh pattern can achieve shielding of noise for the touch area, and improve the signal anti-interference ability of the touch panel 10 in the bending area BA. Moreover, because the metal mesh lines are connected with the touch electrodes in parallel, the impedance of the touch electrodes can be reduced, and the sensitivity of the touch panel is improved.

Figure 8D:
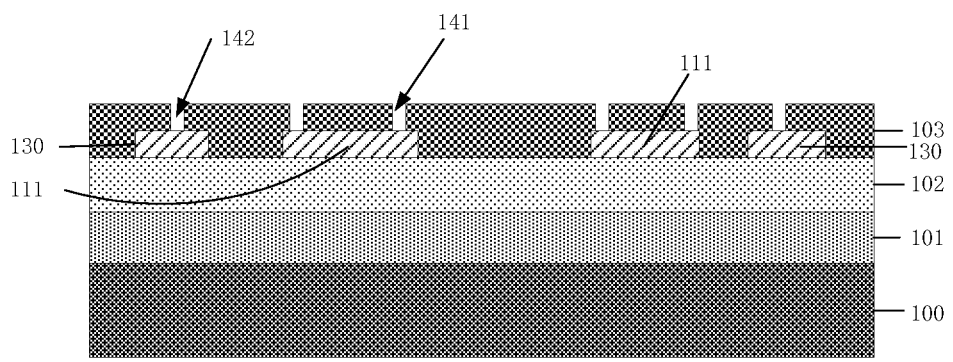
Figure 8E:
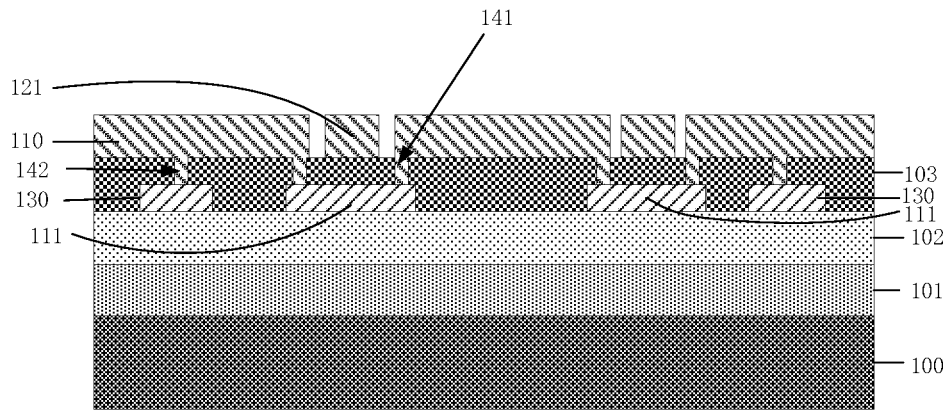

FIG. 8D-8E illustrate a method of manufacturing a touch panel provided by another embodiment of the present disclosure. As shown in the figures, the difference from the manufacturing method in the previous embodiment is that the metal mesh pattern 13 and the first connection lines 111 are formed to be insulated from each other. A second via hole 142 is also formed while the first via hole(s) 141 is/are formed in the insulating layer 103, and the second via hole 142 is formed corresponding to the first metal mesh line 130 and exposes the first metal mesh line 130. The first touch electrode portion 110 is connected with the first metal mesh line 130 through the second via hole 142 in parallel. In this way, a touch panel as shown in FIG. 4B is formed.

Figure 8F:
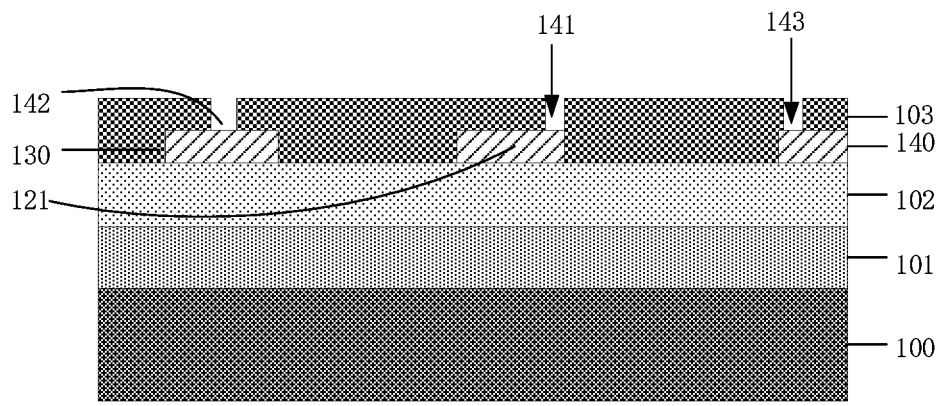
Figure 8G:
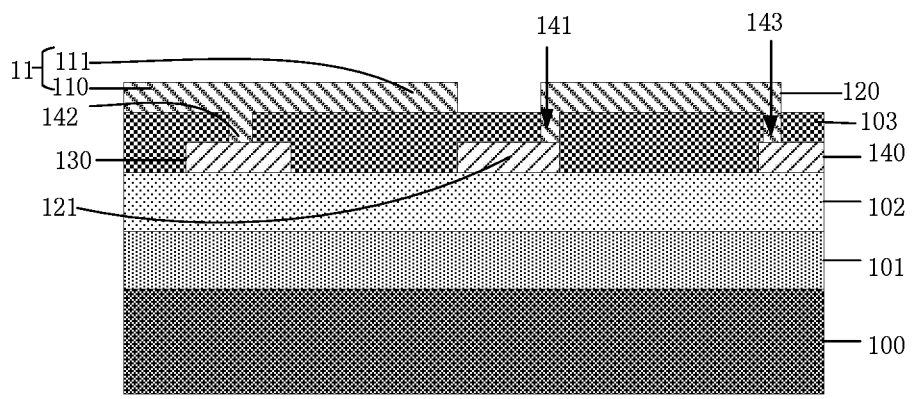

FIG. 8F-8G illustrate a method of manufacturing a touch panel provided by yet another embodiment of the present disclosure. The difference from the manufacturing method in the above embodiment is that, as shown in the figures, in the manufacturing method provided in this embodiment, the first touch electrode portion 110 of the first touch electrode 11 and the first connection lines 111 are formed in a single process, the second touch electrode 12 forms a bridge structure.

As shown in FIG. 8F, the metal mesh lines 130 of the metal mesh pattern 13 and the second connection lines 121 of the second touch electrodes 12 are formed in a same patterning process and insulated from each other. For example, the traces 140 are formed while the metal mesh lines 130 of the metal mesh pattern 13 and the second connection lines 121 are formed.

A second via hole 142 and a third via hole 143 are formed in the insulating layer 103 while the first via hole(s) 141 is/are formed. The first via hole(s) 141 is/are formed corresponding to the second connection lines 121 and exposes a portion of the second connection lines 121. The two via hole 142 is formed corresponding to the first metal mesh line 130 and expose a portion of the first metal mesh line 130, and the third via hole 143 is formed corresponding to the traces 140 and expose a portion of the trace 140.

As shown in FIG. 8G, the first touch electrode portion 110 of the first touch electrode 11 is formed in a same patterning process as the first connection line (not shown) and the second touch electrode portion 120. The first touch electrode 11 is electrically connected to the first metal mesh line 130 through the second via hole 142. The second touch electrode portion 120 is electrically connected to the second connection line 121 through the first via hole 141. For example, the first touch electrode 11 and the second touch electrode portion 120 are electrically connected to the corresponding traces 140 through the corresponding third via holes 143, respectively. In this way, a touch panel as shown in FIG. 4C is formed.

The described above is only related to exemplary embodiments of the disclosure only and not intended to limit the scope of the present disclosure; and the scope of the present disclosure is defined by the appended claims.

What is claimed is:

1. A touch panel, comprising:
   a bending area bent along a bending axis;
   a plurality of first touch electrodes extending along a first direction;
   a plurality of second touch electrodes extending along a second direction;
   a metal mesh pattern provided at least in the bending area, including a first metal mesh line, wherein the first metal mesh line extends along the first direction and is connected with the first touch electrodes in parallel, and the second direction intersects with the first direction;
   wherein each of the plurality of first touch electrodes includes a first touch electrode portion and a first connection line which are alternately connected, each of the plurality of second touch electrodes includes a second touch electrode portion and a second connection line which are alternately connected;
   the second touch electrode portions are provided in a same layer as the second connection lines, and the touch panel further includes a first insulating layer between part of the first touch electrode portions and part of the first connection lines, the first touch electrode portions being electrically connected to the first connection lines through first via holes in the first insulating layer; and the first metal mesh line is provided in a same layer as the first connection lines and is electrically connected to the first connection lines, so as to be connected with the first touch electrodes in parallel.

2. The touch panel according to claim 1, wherein a direction of the bending axis is parallel to the second direction, and the metal mesh pattern comprises a plurality of the first metal mesh lines insulated from each other, the plurality of the first metal mesh lines being respectively connected with the plurality of first touch electrodes in parallel.

3. The touch panel according to claim 1, wherein a direction of the bending axis is parallel to the first direction, at least one of the first touch electrodes is located in the bending area, and the first metal mesh line is connected with the at least one of the first touch electrodes in parallel.

4. The touch panel according to claim 3, wherein
the first touch electrode portions are provided in a same layer as the second touch electrode portion, and the first connection lines and the second connection lines are insulated from each other and overlapped with each other.

5. The touch panel of claim 1, wherein the metal mesh pattern further comprises a second metal mesh line, the second metal mesh line being configured as the first connection lines.

6. The touch panel according to claim 1, wherein
an other part of each first touch electrode portion is provided in a same layer as a corresponding part of a corresponding first connection line, and the touch panel further includes a second insulating layer between the second touch electrode portions and the second connection lines, the second touch electrode portions being electrically connected to the second connection lines through first via holes in the second insulating layer.

7. The touch panel according to claim 6, wherein the first metal mesh line is provided in a same layer as the second connection lines and insulated from the second connection lines, and is connected with the first touch electrodes in parallel through a second via hole in the second insulating layer.

8. An electronic device, comprising a touch panel, wherein the touch panel comprises:
a bending area bent along a bending axis;
a plurality of first touch electrodes extending along a first direction;
a plurality of second touch electrodes extending along a second direction;
a metal mesh pattern provided at least in the bending area, including a first metal mesh line, wherein the first metal mesh line extends along the first direction and is connected with the first touch electrodes in parallel, and the second direction intersects with the first direction;
wherein each of the plurality of first touch electrodes includes a first touch electrode portion and a first connection line which are alternately connected, each of the plurality of second touch electrodes includes a second touch electrode portion and a second connection line which are alternately connected;
the second touch electrode portions are provided in a same layer as the second connection lines, and the touch panel further includes an insulating layer between part of each first touch electrode portion and part of a corresponding first connection line, the first touch electrode portions being electrically connected to the first connection lines through first via holes in the insulating layer; and
the first metal mesh line is provided in a same layer as the first connection lines and is electrically connected to the first connection lines, so as to be connected with the first touch electrodes in parallel.

9. The electronic device according to claim 8, further comprising a display panel, wherein the touch panel is stacked with the display panel.

10. A method of manufacturing a touch panel, the touch panel comprising a bending area, the method comprising:
forming a plurality of first touch electrodes extending along a first direction;
forming a plurality of second touch electrodes extending along a second direction; and
forming a metal mesh pattern in the bending area, wherein the metal mesh pattern includes a first metal mesh line, the first metal mesh line extending along the first direction and being connected with the plurality of first touch electrodes in parallel, and the second direction intersecting with the first direction,
wherein each of the plurality of second touch electrodes comprises a second touch electrode portion and a second connection line which are alternately connected, the metal mesh pattern and the second connection lines are formed in a same patterning process and insulated from each other.

11. The method according to claim 10, wherein each of the plurality of first touch electrodes comprises a first touch electrode portion and a first connection line which are alternately connected, the first metal mesh lines and the first connection lines being formed in a single patterning process and electrically connected with each other.

12. The method according to claim 11, wherein the metal mesh pattern further comprises a second metal mesh line, the second metal mesh line being formed as the first connection lines.

13. The method according to claim 10, further comprising:
forming an insulating layer between an other part of the metal mesh pattern and a corresponding part of each second touch electrode portion, and forming first via holes in the insulating layer, wherein the second touch electrode portions are electrically connected to the second connection lines through the first via holes in the insulating layer.

14. The method according to claim 13, further comprising forming a second via hole in the insulating layer while the first via holes are formed, the first metal mesh line being connected with a first touch electrode in parallel through the second via hole.

15. The method according to claim 10, wherein
each of the plurality of first touch electrodes includes a first touch electrode portion and a first connection line which are alternately connected; and
the first touch electrode portions are formed in a same layer as the second touch electrode portions, and the first connection lines and the second connection lines are formed to be insulated from each other and overlapped with each other.

* * * * *